US012749130B2

(12) United States Patent
Lee et al.

(10) Patent No.: US 12,749,130 B2
(45) Date of Patent: Sep. 29, 2026

(54) ENERGY MANAGEMENT APPARATUS AND ENERGY MANAGEMENT METHOD

(71) Applicant: LG ELECTRONICS INC., Seoul (KR)

(72) Inventors: Kamin Lee, Seoul (KR); Seungjae Min, Seoul (KR); Heeyeon Choi, Seoul (KR); Hongkyu Kim, Seoul (KR); Jihack Lee, Seoul (KR); Hyejeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 18/533,647

(22) Filed: Dec. 8, 2023

(65) Prior Publication Data

US 2024/0212075 A1 Jun. 27, 2024

(30) Foreign Application Priority Data

Dec. 21, 2022 (KR) ........................ 10-2022-0180857

(51) Int. Cl.
*G06Q 50/06* (2024.01)
*G06N 5/022* (2023.01)

(52) U.S. Cl.
CPC ............. *G06Q 50/06* (2013.01); *G06N 5/022* (2013.01)

(58) Field of Classification Search
None
See application file for complete search history.

(56) References Cited

FOREIGN PATENT DOCUMENTS

| | | |
|---|---|---|
| CN | 104200297 | 12/2014 |
| CN | 114154781 | 3/2022 |
| CN | 115276001 | 11/2022 |
| JP | 2015019483 | 1/2015 |
| KR | 1020210088070 | 7/2021 |
| KR | 102396712 | 5/2022 |
| WO | 2020026874 | 2/2020 |

OTHER PUBLICATIONS

English Translation of JPWO2020/026874A1. (Year: 2020).*
PCT International Application No. PCT/KR2023/016642, International Search Report dated Feb. 6, 2024, 10 pages.
Korean Intellectual Property Office Application No. 10-2002-0180857, Office Action dated Aug. 13, 2025, 6 pages.

* cited by examiner

*Primary Examiner* — Ryan A Jarrett
(74) *Attorney, Agent, or Firm* — LEE, HONG, DEGERMAN, KANG & WAIMEY

(57) ABSTRACT

The present disclosure relates to an energy management apparatus and an energy management method. An energy management apparatus according to one embodiment includes an energy generation prediction unit having an energy generation prediction model, an energy consumption prediction unit having an energy consumption prediction model, and a control module to adjust a power purchase time point and a quantity of power to be purchased for each time zone based on the predicted energy generation output from the energy generation prediction model and the predicted energy consumption output from the energy consumption prediction model.

9 Claims, 8 Drawing Sheets

(a) (b)

(a)

(b)

ENERGY MANAGEMENT APPARATUS AND ENERGY MANAGEMENT METHOD

CROSS-REFERENCE TO RELATED APPLICATION

Pursuant to 35 U.S.C. § 119(a), this application claims the benefit of earlier filing date and right of priority to Korean Patent Application No. 10-2022-0180857, filed on Dec. 21, 2022, the contents of which are hereby incorporated by reference herein in its entirety.

TECHNICAL FIELD

The present disclosure relates to an energy management apparatus and an energy management method, and more particularly, an energy management apparatus capable of performing an optimized energy management using a deep learning algorithm, and an energy management method thereof.

BACKGROUND

An electricity pricing system in Korea was differentially applied by dividing electricity use into household, commercial, educational, industrial uses, etc., and an increasing block rate pricing, namely, progressive pricing policy was applied to the household electric charges.

The progressive pricing applied to the household electric charges has consistently raised an equality issue that high-income single-person households pay lower charges for electricity than low-income multi-person households, and excessively high prices are imposed to multi-cost-intensive households, as compared to other countries.

An energy storage device, i.e., Energy Storage System (ESS) device refers to a storage device (system) that store power excessively generated in a power plant and transmits the power upon a temporary power shortage. Th ESS device includes a batter for storing electricity, and related components such as a Power Conditioning System (PCS), an Energy Management System (EMS), a Battery Management System (EMS), etc. for efficiently managing the battery.

In California in USA, demands on new renewable energy, like compulsory installation of solar power plants on newly-constructed houses, and the like, are increasing. Accordingly, the energy storage system (ESS) device (or battery) is installed at home, in a building, to receive new renewable energy and store surplus power. Thus, load power is supplied from the ESS device when power or energy is needed, so as to efficiently consume energy.

Also, as aforementioned, grid utilities are generally applying variable rates of differentially imposing a unit cost of prices of electricity use in each time zone, namely, Time Of Use (TOU).

Therefore, to economically use electric energy, the load of energy consumption is needed to be distributed from a section requiring for high electricity rates, namely, high TOU into a section requiring for low electricity rates.

In case where an electricity rate for each time zone, namely, TOU is not considered, when a quantity of power generated in an energy generator installed at home is larger than a quantity of power consumed, surplus power is charged in an energy storage system or sells to a grid. When the quantity of power consumed is larger than the quantity of power generated, load power is consumed using generated power and insufficient power is brought from the energy storage system. when power stored in the energy storage system is fully used, the load power is filled by receiving (purchasing) power from the grid.

In this case, to minimize the rate of energy purchased from the grid, a Power Conditioning System (PCS), which is in charge of charging/discharging of the energy storage system (ESS) may perform charge/discharge control to adjust an energy reception time and a quantity of power to purchase to those at an off-peak time (i.e., a range of prices in which the TOU is low).

In the related art, a battery with a predetermined capacity or more was unconditionally charged at the off-peak time and discharged at an on-peak time. However, this causes problems of unnecessary charging, and an occurrence of a case where energy to be generated is inefficiently used or generated energy is not stored.

SUMMARY

The present disclosure is to solve those problems and other drawbacks, and one aspect of the present disclosure is to provide an energy management apparatus, capable of managing energy in an optimized manner, and an energy management method thereof.

Another aspect of the present disclosure is to provide an energy management apparatus, capable of optimizing a purchase time of power and an amount of power to be received from a grid through machine learning, and an energy management method thereof.

An energy management apparatus according to one embodiment to achieve those aspects includes an energy generation prediction unit having an energy generation prediction model, an energy consumption prediction unit having an energy consumption prediction model, and a control module to adjust a power purchase time point and a quantity of power to be purchased for each time zone based on the predicted energy generation output from the energy generation prediction model, and the predicted energy consumption output from the energy consumption prediction model.

According to an embodiment, the energy generation prediction model inputs as an input value at least one of past energy generation, weather, and energy generation information, and outputs as an output value predicted energy generation for each time zone.

According to an embodiment, the energy consumption prediction model inputs as an input value at least one of past energy consumption, weather, holiday information, and home appliance energy consumption, and outputs as an output value predicted energy consumption for each time zone.

According to an embodiment, the control module calculates a required quantity of power by which a power shortage is expected by computing the predicted energy generation and the predicted energy consumption for each time zone, and purchases the calculate required quantity of power based on Time of Use (TOU), to store the same in an Energy Storage System (ESS).

According to an embodiment, the TOU is a price per unit power fixed for each time zone.

According to an embodiment, the control module determines a power purchase time and a quantity of power to be purchased based on the predicted energy generation and energy consumption for each time zone, which are computed by the energy generation prediction unit and the energy consumption prediction unit, and the TOU.

According to an embodiment, the control module primarily calculates a required quantity of power for a next day for each time zone using the predicted energy generation and the predicted energy consumption for each time zone, calculated by the energy generation prediction unit and the energy consumption prediction unit, and secondarily compensates for the required quantity of power for each time zone by compensating for the predicted energy generation and the predicted energy consumption for each time zone a predetermined time before a time point at which TOU rises.

According to an embodiment, the TOU includes at least two time zones, in which different pricings are applied, and the control module purchases in advance power required at a time zone, in which the pricing rises, a predetermined time before a time point at which the pricing rises, and stores the purchased power in the ESS.

According to an embodiment, the power required at the pricing-risen time zone is calculated based on the compensated required quantity of power for each time zone.

An energy management method according to one embodiment of the present disclosure includes predicting energy generation for each time zone, predicting energy consumption for each time zone, computing a required quantity of power for each time zone based on the predicted energy generation and the predicted energy consumption, and determining a power purchase time and a quantity of power to be purchased based on the required quantity of power for each time zone and Time Of Use (TOU).

According to the present disclosure, a required quantity of power (energy, electricity) can be purchased in advance to be stored in an energy storage system before TOU rises, thereby overcoming a problem of unnecessarily receiving a large quantity of power at a time point at which the TOU is low.

DETAILED DESCRIPTION OF THE EMBODIMENTS

Figure 1:
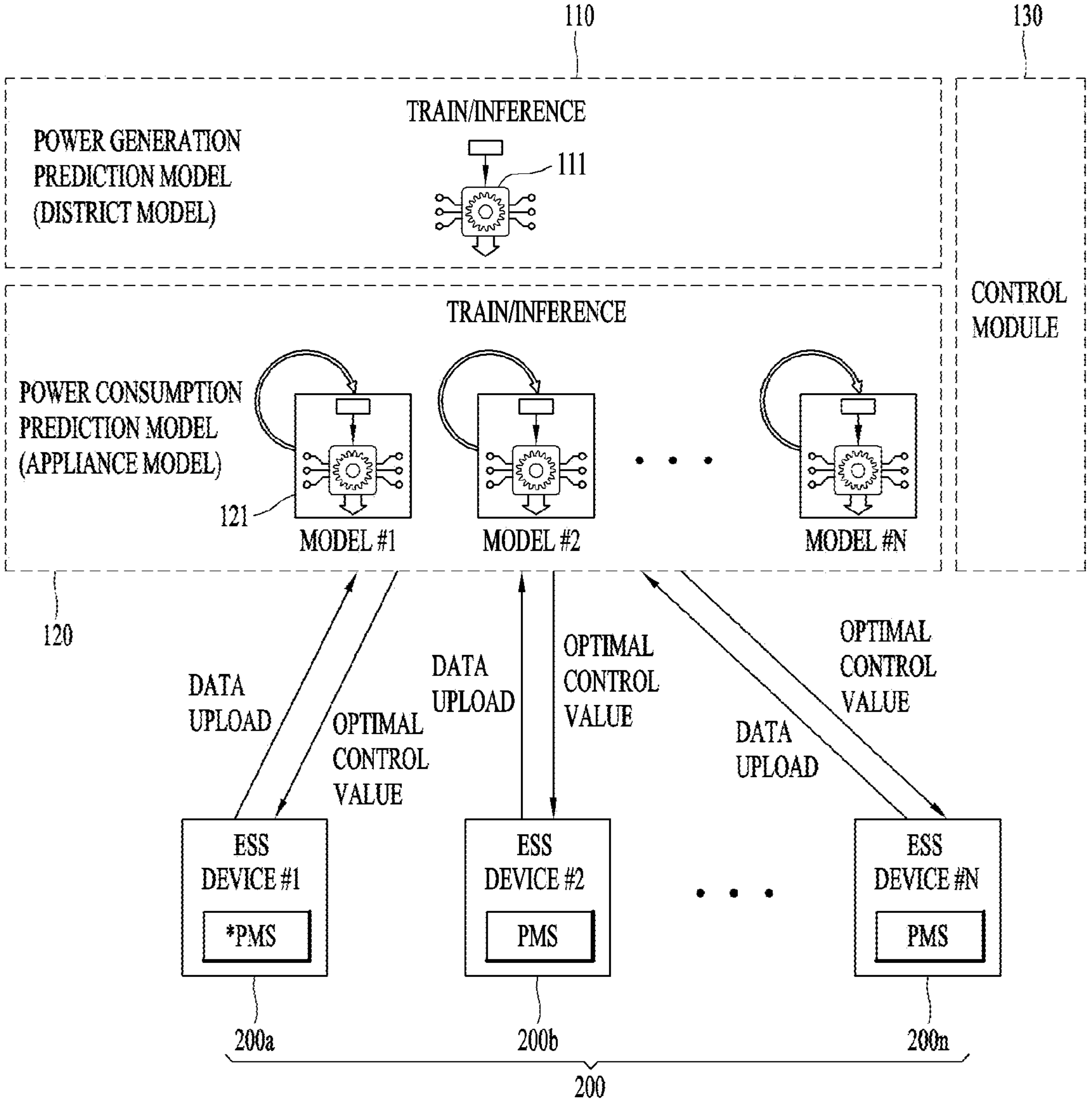
FIG. 1 is a block diagram illustrating an energy management apparatus according to one embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Display devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the display devices.

FIG. 1 is a block diagram illustrating an energy management apparatus according to one embodiment of the present disclosure.

An energy management apparatus according to the present disclosure may refer to a server of managing energy (or power) in country/district units, or an apparatus of managing energy in village/building/house units.

The energy management apparatus may receive from a grid in advance an energy shortage at an off-peak time by predicting a quantity of power (or energy) to be generated by a device (e.g., solar panels, etc.), which is installed in an object (country/district/village/building/house, etc.) to be managed, and a quantity of power to be consumed in the object to be managed.

In this case, the energy management apparatus according to the present disclosure may predict such quantities of energy in a unit of one hour by considering efficiency of energy to be generated, or may determine a quantity of power to be received by considering a residual space of a battery (or energy storage system).

Also, the energy management apparatus according to the present disclosure may predict (compute) a power shortage more accurately by compensating for a predicted value of energy generation/energy consumption before a price rise time (or up-riser) of TOU.

To this end, the energy management apparatus according to the present disclosure includes an energy generation (or power generation) prediction unit 110 having an energy generation prediction model 111, an energy consumption (or power consumption) prediction unit 120 having an energy consumption prediction model 121, and a control module 130 that adjusts a power purchase time and a quantity of power to be purchased for each time zone on the basis of a predicted energy generation output from the energy generation prediction model and a predicted energy consumption output from the energy consumption prediction model.

The energy generation prediction model and the energy consumption prediction model may be artificial intelligent models trained through machine learning.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer may include one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is input to the artificial neural network. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning may include deep learning.

The energy generation prediction model and the energy consumption prediction model may be one of the various neural networks.

The energy generation prediction model and the energy consumption prediction model, for example, may output (compute, determine) a predicted energy generation for each time zone and a predicted energy consumption for each time zone through supervised learning.

To this end, the energy generation prediction model 111 may output as an output value the predicted energy generation for each time zone by inputting as an input value at least one of past energy generation, weather, and energy generation information.

As illustrated in FIG. 1, the energy generation prediction model 111 may predict an energy generation for an object to be managed (e.g., in a district unit).

Also, the energy consumption prediction model 121 may output as an output value the predicted energy consumption for each time zone by inputting as an input value at least one of past energy consumption, weather, holiday information, and home appliance energy consumption.

The energy consumption prediction model 121 may predict energy consumption through division for each household or appliance, and thus its management unit may be smaller than that of the energy generation prediction model.

Afterwards, the control module 130 may adjust (control or determine) a power purchase time and a quantity of power for each time zone on the basis of the predicted energy generation output from the energy generation prediction model and the predicted energy consumption output from the energy consumption prediction model.

The control module 130 may transmit and receive data through communication with a Power Management System (PMS) of an Energy Storage System (ESS) and receive information related to a quantity of power stored in the ESS and an available space for storing power in the ESS.

Also, the control module 130 may perform an overall control for energy charge/discharge of the ESS.

Figure 2:
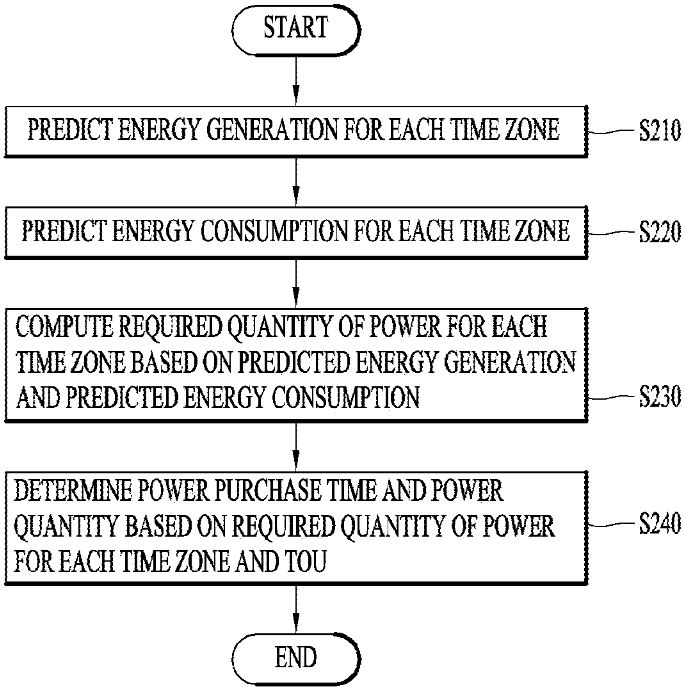
FIG. 2 is a flowchart illustrating an energy management method according to one embodiment of the present disclosure.

FIG. 2 is a flowchart illustrating an energy management method according to one embodiment of the present disclosure, and FIGS. 3, 4, 5, 6, 7, and 8 are conceptual views for explaining the energy management method of FIG. 2.

An energy management method according to the present disclosure may be performed by the control of the energy management apparatus.

Referring to FIG. 2, the energy management method includes predicting an energy generation (or power generation) for each time zone, and predicting an energy consumption (or power consumption) for each time zone (S210 and S220).

Figure 3:
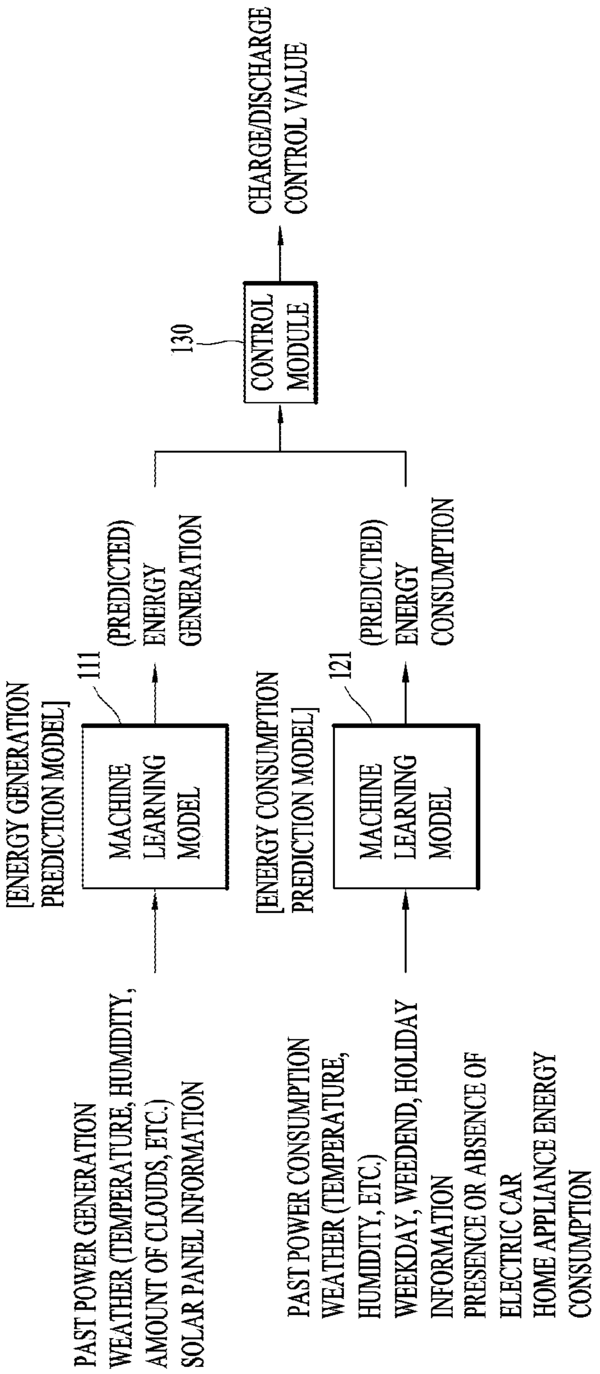
FIGS. 3, 4, 5, 6, 7, and 8 are conceptual views for explaining the energy management method of FIG. 2.

As illustrated in FIG. 3, the energy generation prediction model 111 may input as an input value past energy generation, weather (temperature, humidity, an amount of cloud, etc.), energy generation information (e.g., solar panel information, etc.), and output as an output value a predicted energy generation for each time zone to be generated for each time zone.

Also, the energy consumption prediction model 121 may input as an input value a past energy consumption, weather (temperature, humidity, etc.), holiday information such as weekday or weekend, and home appliance energy consumption, such as presence or absence of an electric vehicle, and the like, and output as an output value a predicted energy consumption for each time zone to be consumed for each time zone.

According to the energy management method, a required quantity of energy (power) for each time zone is computed based on the predicted energy generation and the predicted energy consumption (S230).

In the related art, the maximum quantity of power or a predetermined quantity or more of power was unconditionally received and charged in the ESS at a time zone with the low TOU, and used the power stored in the ESS at a time zone in which a power shortage is caused.

This causes an unnecessary power reception and an unnecessary power generation due to no space for storing power which is generated in a time zone in which a larger quantity of power is generated.

However, the energy management apparatus according to the present disclosure may predict energy generation and energy consumption for each time zone based on energy generation/energy consumption prediction models trained through machine learning, and store power in the ESS by receiving a required quantity of power from the grid.

To this end, the control module 130 may compute the predicted energy generation and the predicted energy consumption for each time zone to calculate a required quantity of power by which a power shortage is expected.

Afterwards, according to the energy management method, a power purchase time and a quantity of power to be purchased are determined based on the required quantity of power for each time zone and the TOU (S240).

The present disclosure may determine a time for purchasing the required quantity of power by considering the TOU.

The control module 130 may purchase the calculated required quantity of power based on the TOU and store the purchased power in the ESS 200.

The TOU may be determined as prices per unit power fixed for each time zone.

Figure 4:
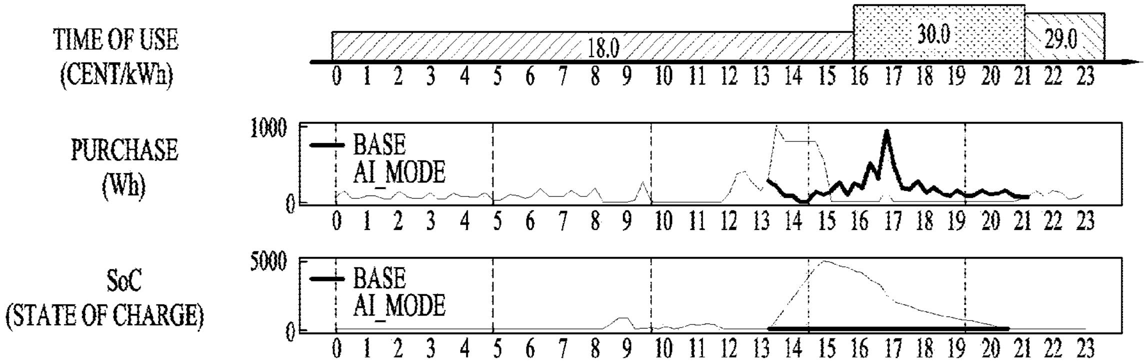

Referring to FIG. 4, based on the TOU shown in the graph on the top, the highest TOU of 30 Cent/kWh may be observed for 16 to 21 as an on-peak time, and the lowest TOU of 18 Cent/kWh may be observed for 0 to 16 as an off-peak time.

In the related art (Base in the graph), it can be seen that the energy consumption is larger than the energy generation at the on-peak time and thus a larger quantity of power is purchased from the grid (Purchase).

Since energy is consumed as soon as purchased, it can be seen that charging is not carried out in the related art (Base), checking a State of Charge (SoC) of the ESS.

On the other hand, in the present disclosure, the energy generation and energy consumption at the on-peak time can be predicted and thus a required quantity of power can be computed in advance. Thereafter, by considering the TOU, a time for purchasing the calculated required quantity of power may be determined.

Referring to FIG. 4, in the present disclosure (AI_MODE in the graphs), the required quantity of power may be purchased in advance a predetermined time (13 to 16) before the TOU rises, by considering the TOU.

Then, the purchased power may be stored in the ESS, and the power stored in the ESS may be used according to a shortage of power at the on-peak time (see SoC).

That is, the present disclosure may determine the power purchase time and the quantity of power to be purchased based on the predicted energy generation and energy consumption for each time zone, which are computed by the energy generation prediction unit and the energy consumption prediction unit, and the TOU.

The present disclosure may compute a shortage of power (e.g., Early Charging (EC)) more accurately by compensating for predicted values before an up-riser section of the TOU (in FIG. 4, 16 at which the TOU rises from 18 to 30).

For example, the control module may predict for each time zone the energy generation/energy consumption with respect to a time of 0 to 23 of the next day, and compensate for the predicted values in advance before computing the quantity of power to be received (EC value).

That is, the control module 130 may primarily calculate for each time zone a required quantity of power for the next day by using the predicted energy generation and the predicted energy consumption for each time zone, computed by the energy generation prediction unit and the energy consumption prediction unit, and secondarily compensate for the predicted energy generation and the predicted energy consumption for each time zone a predetermined time before the TOU up-riser time, thereby compensating for the required quantity of power for each time zone.

As aforementioned, the TOU may include at least two time zones in which different pricings are applied (0-16, 16-21, and 21-24 in FIG. 4).

The control module 130 may purchase in advance power required at a time zone, in which pricing rises, a predetermined time before a time point at which the pricing rises, and store the purchased power in the ESS.

In this case, the power required at the pricing-risen time zone may be computed based on the compensated required quantity of power for each time zone.

Figure 5:
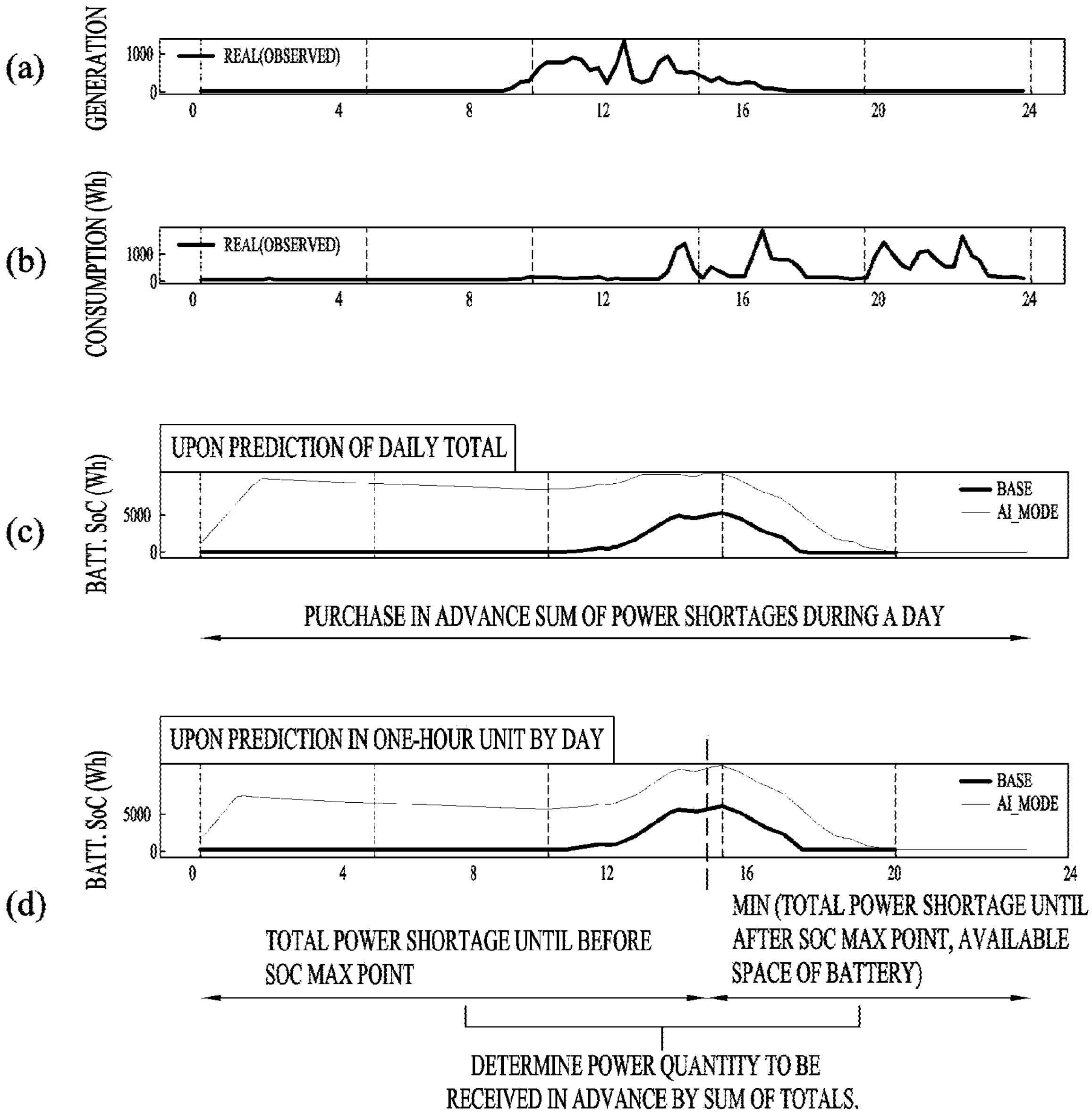

Referring to (a) of FIG. 5, checking the predicted energy generation for each time zone, it is predicted that power is generated at a time zone of 10 to 16. Also, referring to (b) of FIG. 5, the predicted energy consumption for each time zone may be high at a time zone of 16 to 17 and a time zone of 20 to 23.

As illustrated in (c) of FIG. 5, when the required quantity of power is primarily calculated on a daily total basis, the control module 130 may receive and store power at a time zone, in which the TOU is relatively low, at the off-peak time, and start to use the power stored in the ESS from the on-peak time (after 16) (AI_MODE).

On the other hand, as illustrated in (d) of FIG. 5, when the required quantity of power for each time zone is secondarily compensated for by compensating for the predicted energy generation and the predicted energy consumption for each time zone a predetermined time before the time point at which the TOU rises, the control module 130 may not receive power in advance to store in the ESS, but receive power as much as the required quantity of power compensated for the predetermined time before the time point (16) at which the TOU rises and then store the received power in the ESS.

That is, the control module 130 may determine a quantity of power to be received in advance by using the sum of power shortage until before the maximum (MAX) point of SoC and the sum of power shortage until after the maximum point of SoC (i.e., the time point at which the TOU rises).

Figure 6:
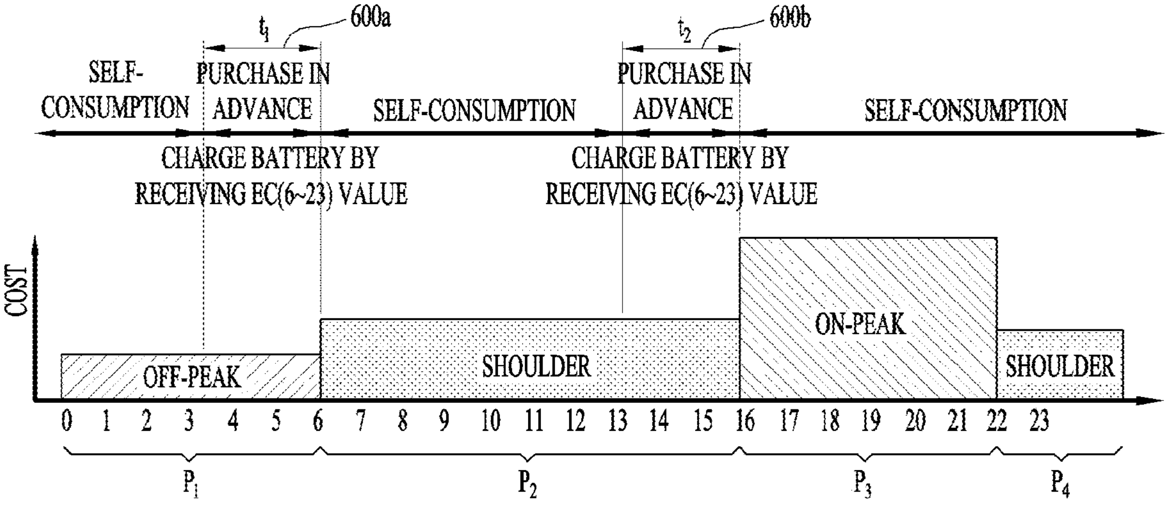

Referring to FIG. 6, the TOU may include at least two time zones P1, P2, P3, and P4 in which different pricings are applied. The control module 130 may purchase (receive from the grid) in advance a quantity of power required at a time zone (P2 in case of t1, P3 in case of t2), in which pricing rises, a predetermined time t1, t2 before a time point (6, 16) at which the pricing rises, and store the purchased power in the ESS.

That is, the present disclosure controls a quantity of power to be charged before a predetermined time because it takes a time to receive power in advance before the pricing rises.

The predetermined time may be, for example, two hours, but is not limited thereto.

The control module 130 may calculate a time until the ESS (battery) is fully charged with power from a fully discharged state at a safe speed, from the perspective of the battery, by receiving current charging speed (c-rate) from the ESS (battery). Then, the control module 130 may receive power in advance in view of securing the time.

The control module 130 may calculate and compensate for a quantity of power (EC) to be charged in advance (as much as a quantity of power by which a power shortage is predicted at the on-peak time) on the basis of the predicted energy generation/energy consumption value.

For example, referring to FIG. 6, EC (6 to 23) may indicate a power shortage from after 6 a.m. that is the up-riser to a time at which the TOU is lower than a current pricing, and EC (16) may indicate a power shortage from after 16 to a time at which the TOU is equal to or lower than the current pricing (the power shortage at 16 to 20 in the drawing on the bottom).

Accordingly, the present disclosure can use energy through discharge without a quantity of power received at the on-peak time, thereby reducing electricity costs.

Figure 7:
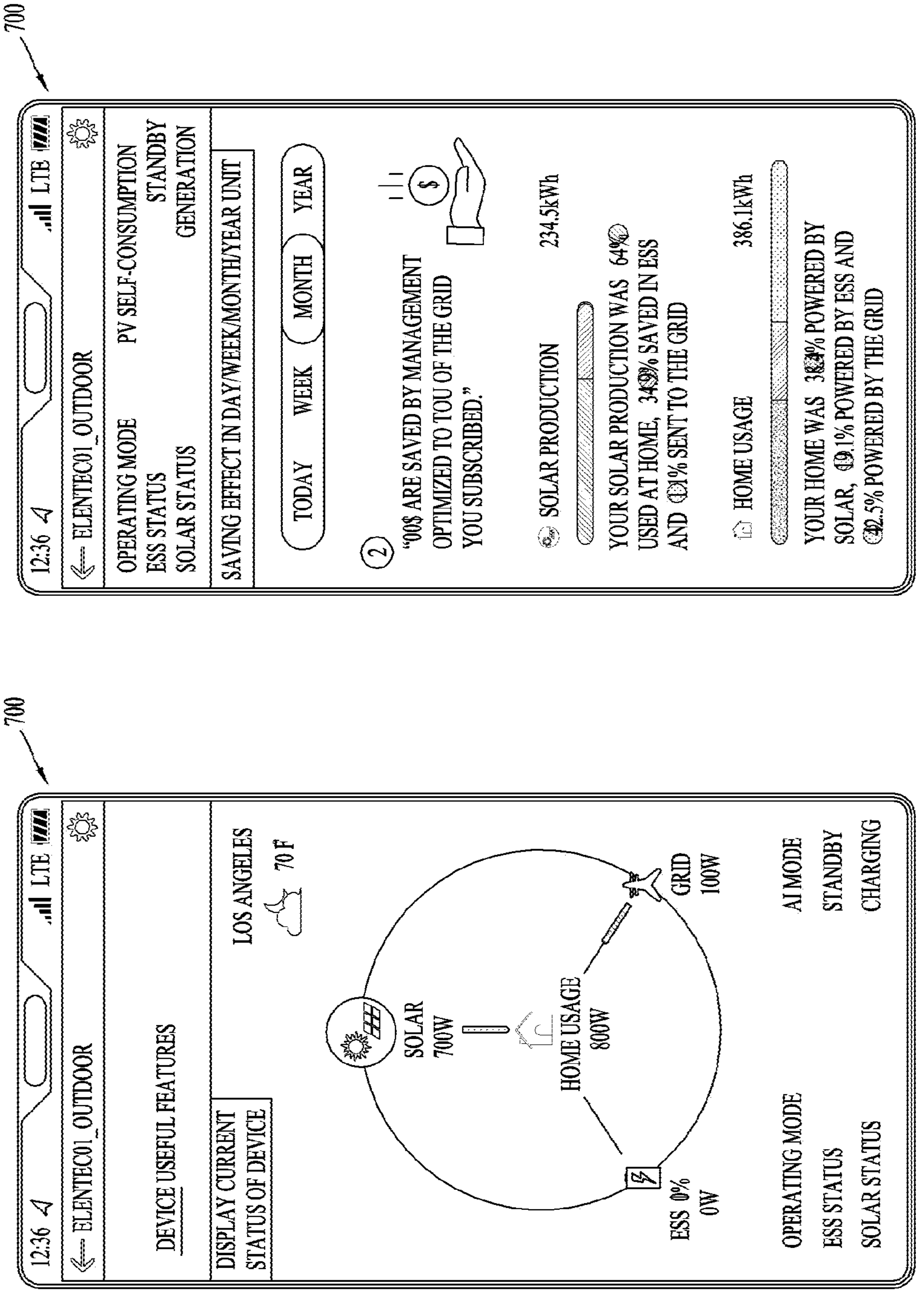

Referring to FIG. 7, the energy management apparatus according to the present disclosure may notify a situation for pre-charging based on predicted values and an alarm of reduction of electricity costs, through a preset application.

Figure 8:
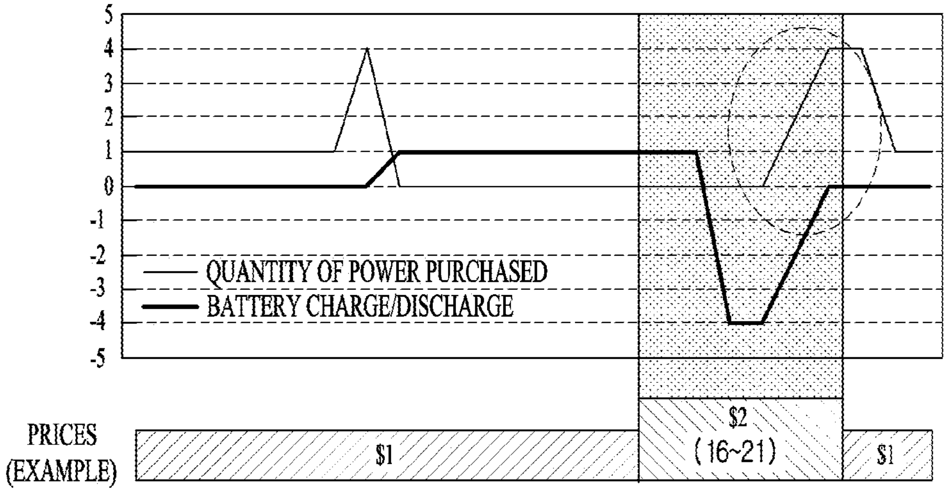
Figure 8:
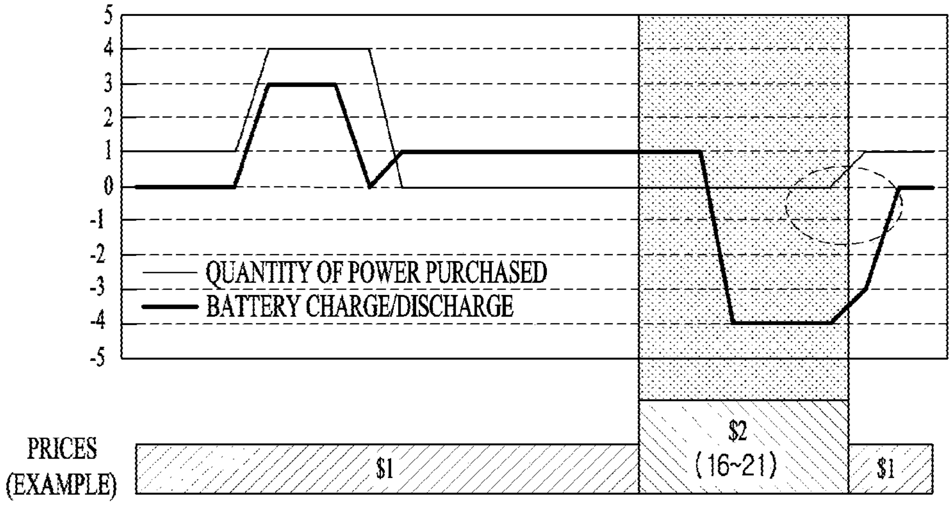

Referring to FIG. 8, the present disclosure can use energy generation as much as possible for required energy consumption, and minimize expenses of electricity costs by charge/discharge control considering costs.

To this end, the present disclosure can control a charge amount such that electricity is purchased in a time zone, in which low prices are paid, according to the TOU of a day, and for this, can perform accurate prediction for energy generation and energy consumption for each time zone.

The energy management apparatus according to the present disclosure may consider a variety of energy generation and energy consumption for individual ESSs according to an installation state and home appliance used. Also, since the energy generation and the energy consumption change due to a difference of frequently used home appliances according to days/seasons, an increase in the number of family members, a purchase of new home appliances, and the like, the energy management apparatus can perform prediction reflecting such continuous changes.

The present disclosure can predict accurate energy generation and energy consumption by using machine learning models, and can learn data collected from individual ESS products.

Also, the energy management apparatus according to the present disclosure can apply an evolved technology of detecting and learning changes, such as periodicity according to days/seasons, the change in family members, a replacement of a home appliance used, or the like, by utilizing external information like weather and the like, state information (SoC) of the ESS battery, etc.

The energy management apparatus according to the present disclosure may compensate for a predicted value when the predicted value is different form a measured value.

Referring to (a) of FIG. 8, in the related art, a large quantity of power is purchased at the on-peak time. On the other hand, referring to (b) of FIG. 8, in the present disclosure, the quantity of power purchased at the on-peak time can be minimized.

So far, the preferred embodiments of the present disclosure have been illustrated and described, but the present disclosure may not be limited to any specific embodiment. It will be understood that various modifications and alternations are made by those skilled in the art to which the present disclosure pertains, without departing from the gist of the present disclosure, and those variations should not be individually construed from the technical ideas or prospects of the present disclosure.

What is claimed is:

1. An energy management apparatus comprising:
- an energy generation predictor having an energy generation prediction model;
- an energy consumption predictor having an energy consumption prediction model; and
- a controller configured to manage a power purchase time and a quantity of power to be purchased for each time zone of a plurality of time zones based on a predicted energy generation output of the energy generation predictor and a predicted energy consumption output of the energy consumption predictor,
- wherein the controller is further configured to:
  - calculate a required quantity of power on a daily total basis using the predicted energy generation and the predicted energy consumption;
  - compute the predicted energy generation and the energy consumption for each time zone of the plurality of time zones; and
  - compensate for the required quantity of power for each time zone of the plurality of time zones by compensating for the predicted energy generation and the predicted energy consumption for each time zone of the plurality of time zones at a predetermined time before a time point at which a Time of Use (TOU) rises.

2. The energy management apparatus of claim 1, wherein the energy generation prediction model receives as an input value at least one of past energy generation, weather, or energy generation information, and outputs as an output value the predicted energy generation for each time zone of the plurality of time zones.

3. The energy management apparatus of claim 1, wherein the energy consumption prediction model receives as an input value at least one of past energy consumption, weather, holiday information, or home appliance energy consumption, and outputs as an output value predicted energy consumption for each time zone of the plurality of time zones.

4. The energy management apparatus of claim 1, wherein the controller:
- calculates a required quantity of power by which a power shortage is expected by computing the predicted energy generation and the predicted energy consumption for each time zone of the plurality of time zones, and
- obtains the calculated required quantity of power based on the TOU, to store the same in an Energy Storage System (ESS).

5. The energy management apparatus of claim 4, wherein the TOU is a price per unit power fixed for each time zone of the plurality of time zones.

6. The energy management apparatus of claim 4,
- wherein the controller determines a power purchase time and a quantity of power to be obtained based on the predicted energy generation and energy consumption for each time zone of the plurality of time zones and the TOU, and
- wherein the predicted energy generation and the energy consumption for each time zone are computed by the controller.

7. The energy management apparatus of claim 1, wherein;
- the TOU includes at least two time zones of the plurality of time zones in which different pricings are applied, and the controller obtains, in advance, power required at a time zone of the plurality of time zones, in which the pricing rises, at a predetermined time before a time point at which the pricing rises, and stores the obtained power in an Energy Storage System (ESS).

8. The energy management apparatus of claim 7, wherein the power required at the pricing-risen time zone is calculated based on the compensated required quantity of power for each time zone of the plurality of time zones.

9. An energy management method performed by a device having a control circuit, the method comprising:

predicting energy generation for each time zone of a plurality of time zones;

predicting energy consumption for each time zone of the plurality of time zones;

computing a required quantity of power for each time zone of the plurality of time zones based on the predicted energy generation and the predicted energy consumption;

determining a power purchase time and a quantity of power to be purchased based on the required quantity of power for each time zone of the plurality of time zones and a Time of Use (TOU); and obtaining power based on the determined power purchase time and the determined quantity of power, wherein the computing the required quantity of power for each time zone of the plurality of time zones further comprises:

calculating a required quantity of power on a daily total basis using the predicted energy generation and the predicted energy consumption;

computing the predicted energy generation and the energy consumption for each time zone of the plurality of time zones; and compensating for the required quantity of power for each time zone of the plurality of time zones by compensating for the predicted energy generation and the predicted energy consumption for each time zone of the plurality of time zones at a predetermined time before a time point at which TOU rises.

* * * * *